United States Patent
Clauss et al.

(10) Patent No.: US 7,168,012 B2
(45) Date of Patent: Jan. 23, 2007

(54) ERROR HANDLING AND REPRESENTATION IN A COMPUTER-AIDED DESIGN ENVIRONMENT

(75) Inventors: James M. Clauss, Tigard, OR (US); Kevin M. Linscott, Cincinnati, OH (US); David J. Ford, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 10/081,446

(22) Filed: Feb. 20, 2002

(65) Prior Publication Data

US 2002/0083377 A1    Jun. 27, 2002

Related U.S. Application Data

(63) Continuation of application No. 09/199,990, filed on Nov. 24, 1998, now Pat. No. 6,363,503.

(51) Int. Cl.
*G06F 11/00* (2006.01)
(52) U.S. Cl. ...................................................... 714/57
(58) Field of Classification Search ................ 714/57, 714/46, 38, 48; 717/125; 709/318
See application file for complete search history.

(56) References Cited

U.S. PATENT DOCUMENTS

| | | | |
|---|---|---|---|
| 5,047,977 A * | 9/1991 | Hill et al. ..................... | 714/57 |
| 5,305,454 A | 4/1994 | Record et al. | |
| 5,528,508 A | 6/1996 | Russell et al. | |
| 5,740,354 A | 4/1998 | Ben-Natan et al. | |
| 5,748,880 A * | 5/1998 | Ito et al. ....................... | 714/46 |
| 5,805,860 A | 9/1998 | Parham | |
| 5,892,898 A * | 4/1999 | Fujii et al. ..................... | 714/57 |
| 5,974,568 A | 10/1999 | McQueen | |
| 6,115,544 A * | 9/2000 | Mueller ....................... | 714/57 |
| 6,199,199 B1 * | 3/2001 | Johnston et al. ............ | 717/107 |
| 6,222,539 B1 * | 4/2001 | Watts ......................... | 345/708 |
| 6,363,503 B1 * | 3/2002 | Clauss et al. ................ | 714/57 |
| 6,397,117 B1 * | 5/2002 | Burrows et al. .............. | 700/97 |

FOREIGN PATENT DOCUMENTS

JP       402255921 A   * 10/1990

* cited by examiner

*Primary Examiner*—Scott Baderman
(74) *Attorney, Agent, or Firm*—Fish & Richardson P.C.

(57) ABSTRACT

The invention includes computer instructions that operate to generate a failure indication upon encountering a failure during an operation performed for a user design. The instructions further operate to automatically facilitate a user in determining a solution for the failure. As a result, the invention provides improved error reporting and recovery.

22 Claims, 7 Drawing Sheets

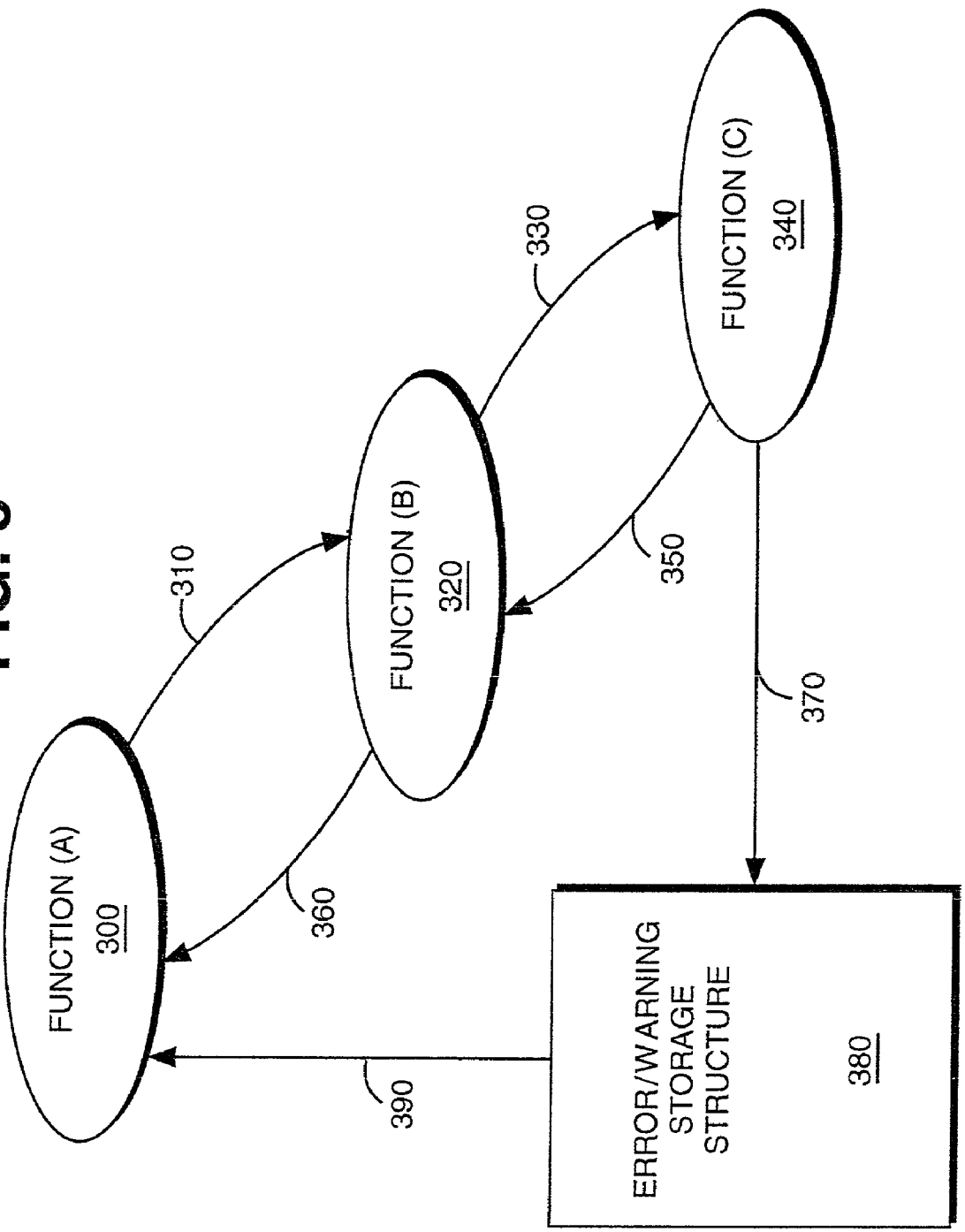

ERROR HANDLING AND REPRESENTATION IN A COMPUTER-AIDED DESIGN ENVIRONMENT

RELATED APPLICATIONS

This application is a continuation of Application Ser. No. 09/199,990, titled "ERROR HANDLING AND REPRESENTATION IN A COMPUTER-AIDED DESIGN ENVIRONMENT", filed on November 24, 1998, now U.S. Pat. No. 6,363,503.

FIELD OF THE INVENTION

The present invention relates to computer-aided design tools. More specifically, the present invention relates to processing and representation of error messages within a computer-aided design environment.

BACKGROUND OF THE INVENTION

Traditionally, one of the weakest and most overlooked areas of software design and development is error reporting and recovery. Prior art computer-aided design systems typically provide multiple error and/or warning messages as the result of a single fault. Multiple messages result from architectural structures wherein warning/error messages are passed through multiple architectural levels from the level where the fault occurs to the level where the warning/error messages are presented to the user.

FIG. 1 is a conceptual illustration of prior art of function calls and returns. For purposes of explanation, it is assumed that the second function called in the example of FIG. 1 cannot complete execution by performing the desired functionality.

According to typical prior art computer aided design applications function(A) 100 calls function(B) 120 with first function call 110. First function call 110 can be any type of function call known in the art, for example, function calls according to a C++ programming environment, or a C programming environment.

Instructions of function(B) 120 are executed until an instruction that calls function(C) 140 is executed. As a result, function call 130 is executed. Instructions of function (C) 140 are executed until some instruction cannot be executed properly. For example, an instruction may perform the function of opening a non-existent file, or a divide by zero operation, a constraint solver failure, etc.

When execution of instructions in function(C) 140 stops because an instruction cannot be complete, function(C) 140 returns a result to function(B) 120 via return 150. Return of results can be performed by any manner known in the art. Typically, when function(C) 140 cannot complete execution, the result(s) returned indicate that an error occurred, and the possible cause of the software fault.

Upon receiving error result(s) from function(C) 140, function(B) 120 cannot complete execution and similarly returns error results to function(A) 100 via return 160. Function(A) 100 thus receives two error results caused by a single error. The greater the number of function calls the greater the number of error messages that are generated based on a single error, which can be confusing and overwhelming to a user of a computer aided design tool employing such an error reporting scheme.

The multiple error messages often result from a subroutine call that returns a error result to the calling subroutine, which in turn returns its own error result along with the original error message to the corresponding subroutine. This process continues until a routine responsible for error reporting is reached. By that time, multiple error results have been generated for a single fault. The same sequence occurs for warning messages.

Another shortcoming of the prior art is that typically only the first or last message for an error is reported, which either lack the context in which the error occurred or lack sufficient detail to accurately describe the error. What is needed is an error reporting mechanism that reduces the number of error/warning messages caused by a single execution fault while providing sufficient detail for the user to understand the error/warning.

BRIEF DESCRIPTION OF THE DRAWINGS

The present invention is illustrated by way of example, and not by way of limitation in the figures of the accompanying drawings in which like reference numerals refer to similar elements.

FIG. 3 is a conceptual illustration of function calls and returns according to one embodiment of the present invention.

DETAILED DESCRIPTION

A method and apparatus for processing and representing error messages within a computer-aided design environment is described. In the following description, for purposes of explanation, numerous specific details are set forth in order to provide a thorough understanding of the present invention. It will be apparent, however, to one skilled in the art that the present invention can be practiced without these specific details In other instances, well-known structures and devices are shown in block diagram form in order to avoid obscuring the present invention.

As used herein, an "error" (also referred to as a hard failure) is a condition that must be corrected in order to proceed, and a "warning" (also referred to as a soft failure) is a condition that is not required to be corrected in order to proceed; however, the result achieved may be different than the result desired. The present invention allows error/warning information to be stored in a central storage location by the function in which the error/warning causing fault occurs. The function then returns a result indicating that the function did not perform as expected.

The calling function does not add an error/warning message of its own when returning, if necessary, to another calling function. The calling function can add detail to the message in order to provide additional detail or context in order to better describe the error/warning. Thus, a minimum set of warning/error messages can be stored and used for reporting the fault that caused the error/warning. In one embodiment, a hierarchical graphical error/warning log provides varying levels of error/warning information in response to user input.

Figure 2:
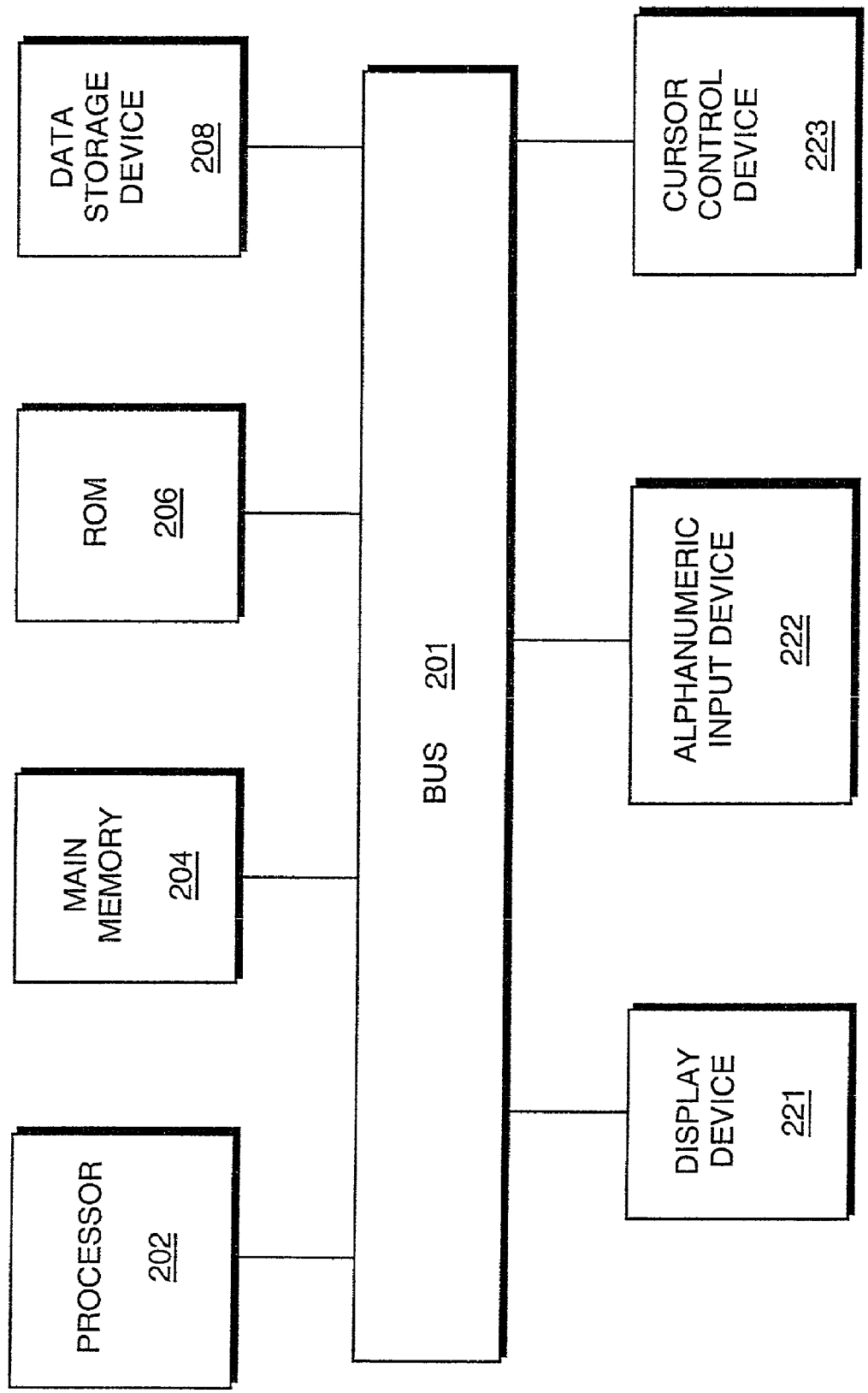
FIG. 2 is a computer system suitable for use with the present invention.

FIG. 2 is one embodiment of a computer system suitable for use with the present invention. Computer system 200 includes bus 201 or other communication device for communicating information, and processor 202 coupled to bus 201 for processing information. Computer system 200 further includes random access memory (RAM) or other dynamic storage device 204 (referred to as main memory), coupled to bus 201 for storing information and instructions to be executed by processor 202. Main memory 204 also can be used for storing temporary variables or other intermediate information during execution of instructions by processor 202. Computer system 200 also includes read only memory (ROM) and/or other static storage device 206 coupled to bus 201 for storing static information and instructions for processor 202. Data storage device 207 is coupled to bus 201 for storing information and instructions.

Data storage device 207 such as a magnetic disk or optical disc and corresponding drive can be coupled to computer system 200. Computer system 200 can also be coupled via bus 201 to display device 221, such as a cathode ray tube (CRT) or liquid crystal display (LCD), for displaying information to a computer user. Alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221.

One embodiment of the present invention is related to the use of computer system 200 to process and present errors related to computer-aided design tools. According to one embodiment, error processing and presentation is performed by computer system 200 in response to processor 202 executing sequences of instructions contained in memory 204. Execution of the sequences of instructions contained in memory 204 causes processor 202 to process and present error messages, as will be described hereafter.

Instructions are provided to main memory 204 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Figure 1:
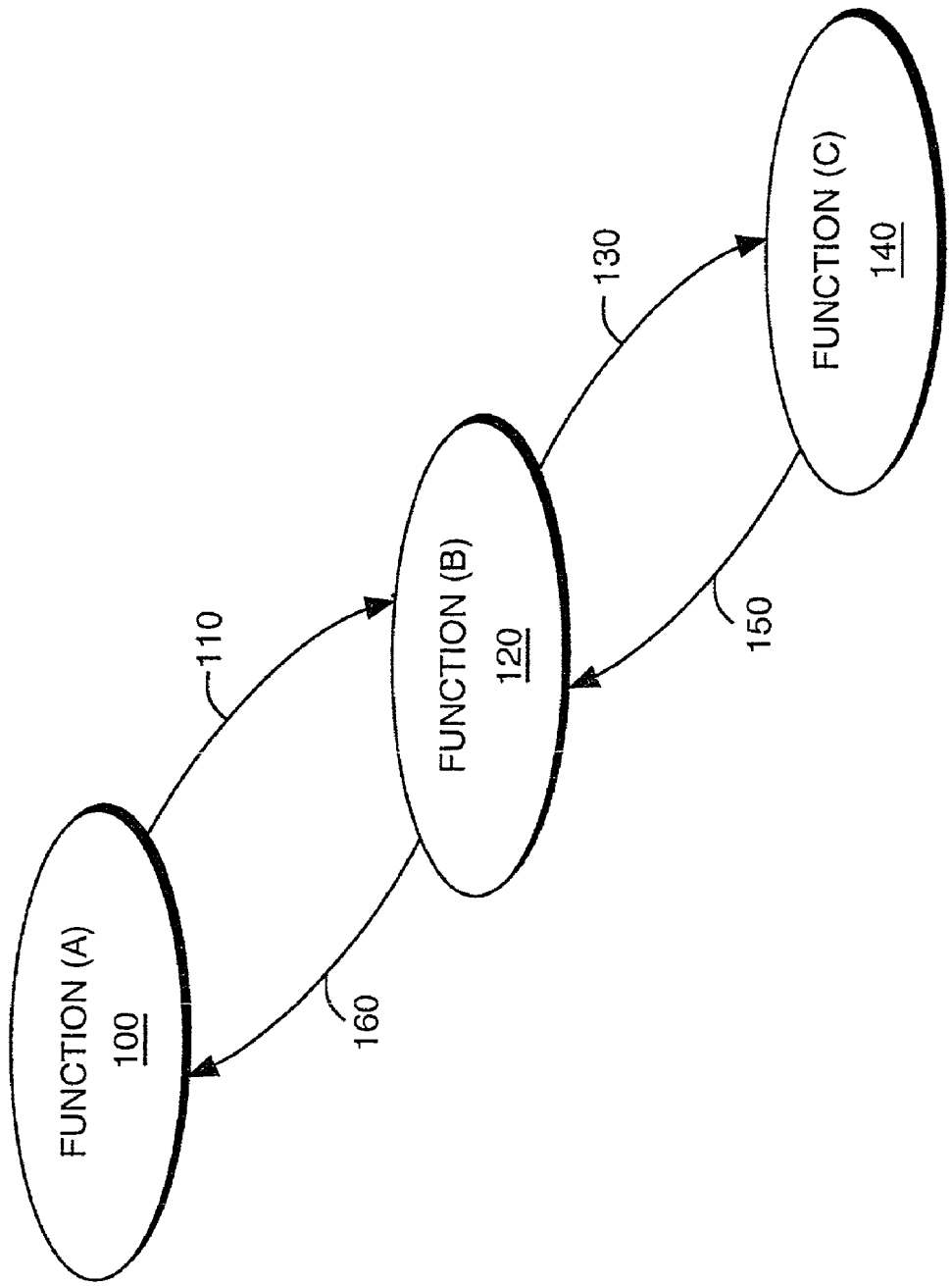
FIG. 1 is a conceptual illustration of prior art of function calls and returns.

FIG. 3 is a conceptual illustration of function calls and returns according to one embodiment of the present invention. As with the function calls of FIG. 1, it is assumed that the second function called in the example of FIG. 3 cannot complete execution when performing the desired functionality.

Function(A) 300 includes sequences of instructions that are executed, for example, by processor 202 of computer system 200. An instruction in the sequence of instructions causes function(A) 300 to call function(B) 320 via function call 310. Function calls can be performed in any manner known in the art.

Function(B) 320 similarly includes sequences of instructions that are executed until an instruction causes a function call. As a result of the instruction that causes the function call, function(C) 340 is called via function call 330. Instructions included in second function call 340 are executed until an instruction cannot be executed properly.

When an instruction cannot be executed property, error notification is sent to error/warning storage structure 380 by notifier 370. In one embodiment, notifier 370 is a "thin wrapper" class that is described in greater detail below. Alternatively, notifier 370 can be a sequence of instructions of function(C) 340 or an independent called function (not shown in FIG. 3), which results in higher overhead than the thin wrapper class embodiment. Function(C) 340 returns results to function(B) 320 via 350. Function(B) 320 in turn returns results to function(A) 300 via 360.

Based on results returned from function(B) 320, function (A) 300 is notified that at least one error and/or warning occurred and that at least one called function did not successfully complete execution. Function(A) 300 retrieves error results from error/warning storage structure 380, via 390, to report the error/warning results to the user of the computer aided design tool. One embodiment for presenting the report is described in greater detail below.

Because the present invention provides a central storage structure for error/warning results, only a minimal set errors/warnings are reported to the user. In one embodiment, intermediate called functions (e.g., function(B) 320) do not receive full error results as in the prior art and subsequently do not pass the received error results with an additional local error result to the corresponding calling function. Alternatively, intermediate called functions add information to the stored error/warning messages if the information is related to details and/or context of the error/warning, and add nothing otherwise. In other words, the function in which the error occurred reports the error to the error/warning storage structure and intermediate functions add information if that information is helpful in reporting. Thus, the user of the computer aided design tool is presented with a more concise listing of errors that occur during an attempted operation.

In one embodiment, the present invention accomplishes the functionality described above by defining an error reporting class referred to herein as the "UTxResult" class. Briefly, a "class" is an object oriented programming construct that describes the characteristics and the operations of the corresponding constituent objects. The following summary is a brief description of classes used in one embodiment of the present invention. Modifications to the specific classes described below can be made without deviating from the spirit and scope of the present invention.

In one embodiment, UTxResult includes a 32-bit error code having 2 severity, 12 facility, 16 error, and 2 reserved bits. UTxResult is used by computer aided design tool subsystems to encode informational, warning and error results. A method is provided to map a UTxResult to a string in the subsystem resource file, which is described in greater detail below. Briefly, a text string that is used to report a particular error is stored in the subsystem resource file and retrieved to report errors based on the result returned. In one embodiment, a zero result from a routine indicates successful completion of the routine. A non-zero result indicates unsuccessful completion of the routine and presence of an error and/or warning in the error/warning log.

UTxResult is a "thin wrapper" class that is used to report non-zero error codes to the error/warning storage structure. When a non-zero UTxResult is returned from a function, a compiler-generated constructor communicates to the error/warning storage structure that the return code is non-zero. When a zero UTxResult is returned no communication with the error/warning storage structure occurs.

A UTxResult object can also be constructed as an automatic (e.g., stack based) instance. In one embodiment, the function that generated the non-successful result is responsible for reporting the result either prior to exit, or via a return value. In one embodiment, functions that have nontrivial implementations should return a UTxResult. Exceptions are if the function is performance sensitive or is guaranteed to succeed.

The UTxResult class is a thin wrapper class because, in one embodiment, non-zero integer results are represented by a macro that expands to a constructor call of the type UTxError or UTxWarning. The constructor call results in the construction of a specialized type (e.g., error or warning) UTxResult object that logs an error/warning report with the error/warning storage structure. Because error/warning reporting is separated via a macro from constructor of zero results, overhead for error-free execution is low.

In one embodiment, by providing an error/warning storage structure, an error/warning is reported once by the function in which the error/warning occurred and not communicated multiple times in multiple function results. Intermediate results need not determine whether an error/warning message has been stored in the error/warning storage structure. Thus, error/warning reporting is simplified and more precise, which results in improved error/warning recovery. A single error/warning log that stores errors/warnings also provides functionality to simpler and more context-sensitive error/warning reporting environment than would otherwise be possible.

Figure 4A:
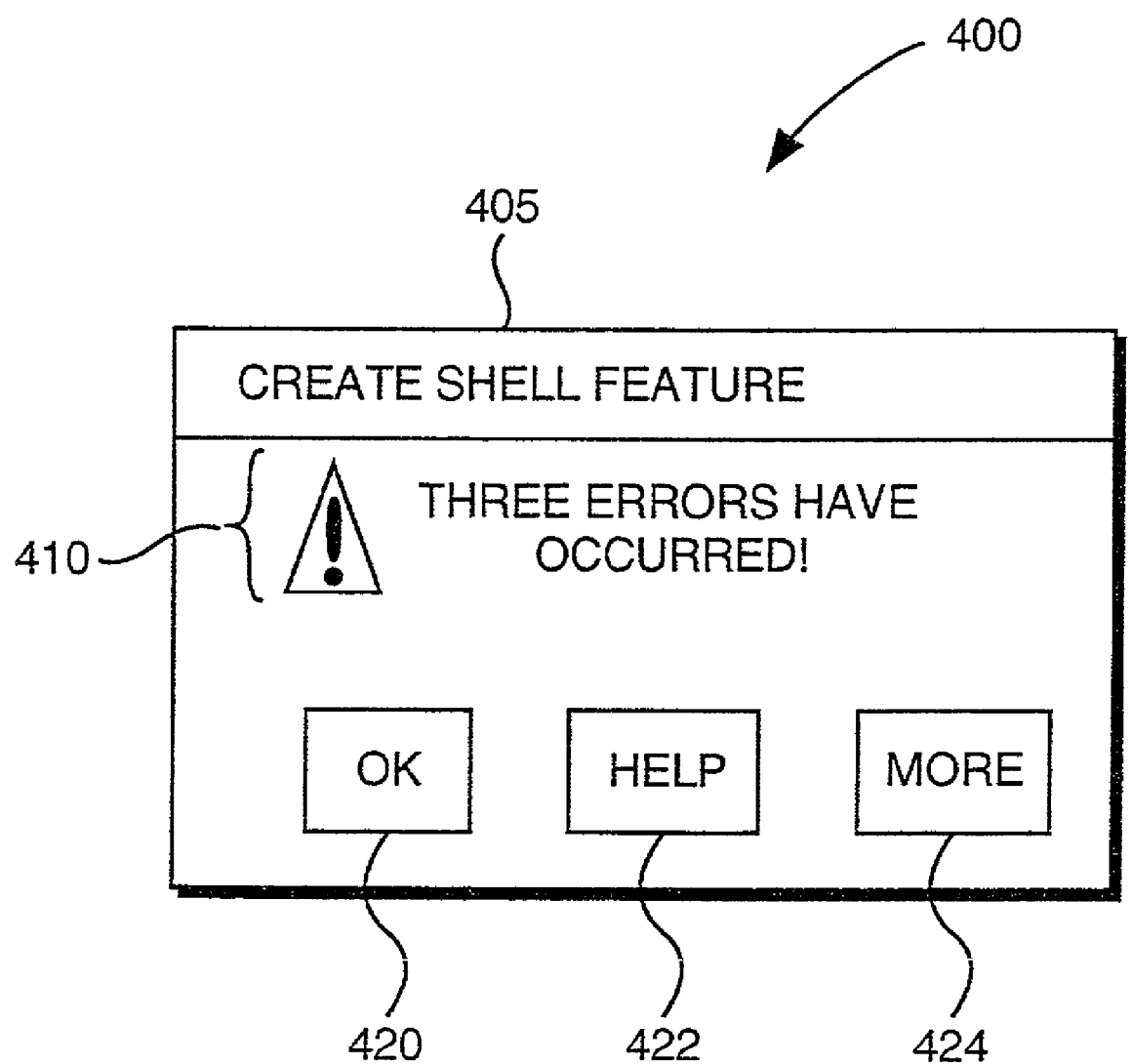
FIGS. 4A and 4B are one embodiment of an error reporting user interface suitable for use with the present invention.
Figure 4B:
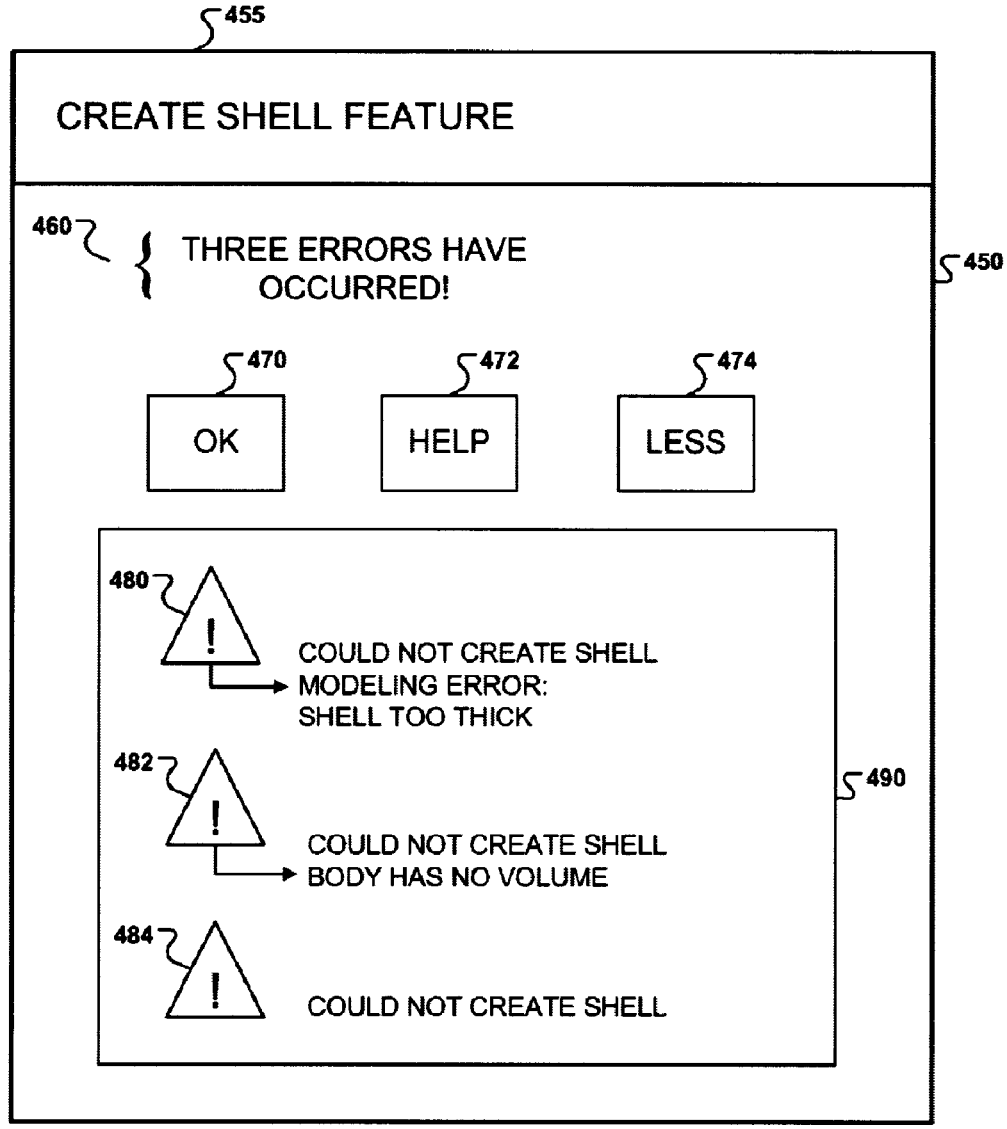

FIGS. 4A and 4B are one embodiment of an error reporting user interface suitable for use with the present invention. While the interface of FIGS. 4A and 4B are described in terms of error reporting, the description is equally applicable to warning reporting.

FIG. 4A is an error report summary that can be presented to a user of a computer aided design tool. Report summary 400 includes title bar 405 that indicates an operation that caused the error/warning. Sentence 410 describes an error in general terms. In one embodiment, an icon is presented to provide the user with visual, non-textual feedback.

Button 420 (OK) allows the user to dismiss summary 400. Button 422 (Help) allows the user to request additional information about errors and/or warnings. Button 424 (More) allows the user to obtain additional information about the errors and/or warnings being reported. In one embodiment, selection of button 424 provides the detailed error log window of FIG. 4B.

FIG. 4B is a detailed error report that can be presented to a user of a computer aided design tool. As with the summary of FIG. 4A, error log 450 can also be used to present warning information to the user. Title bar 455 indicates an operation that caused the error/warning to occur.

Button 470 (OK) allows the user to dismiss log 450. Button 472 (Help) allows the user to request additional information about errors and/or warnings. Button 474 (Less) allows the user to reduce the amount of information about the errors and/or warnings being reported. In one embodiment, selection of button 474 provides the error summary window of FIG. 4A.

In one embodiment, a list of errors is presented in field 490. In the example of FIG. 4B, three errors (labeled 480, 482 and 484) are presented. Brief descriptions of the associated errors can also be presented. In one embodiment, explanation 460 provides a one sentence description of a selected error. In the example of FIG. 4B, error 480 is selected.

In one embodiment, errors are presented in a hierarchical manner where each level of the display hierarchy provides a level of information related to the associated error. For example, a construction error caused by a shell that is too thick can be initially presented as a "Could not create shell" in field 490 with an error or warning icon (see, for example, error 480). In one embodiment, the text string "Could not create shell" is retrieved from the subsystem resource file based on the return value from the function in which the error/warning occurred. If the user expands the construction error, additional information can be provided, for example, "modeling error: shell too thick." The text string "modeling error: shell too thick" is also obtained from the subsystem resource file. This additional information provides the user with information about how to recover from the error.

In one embodiment selection of an error/warning provides visual feedback related to the cause of the error/warning. For example, if an error is caused by a particular portion of a design, that portion of the design is highlighted in the document/design window. Alternatively, the cause of the error/warning can be visually indicated in another manner. In one embodiment, an icon associated with the error/warning is modified (e.g., a light bulb overlays the ordinary error/warning icon) to indicate that visual feedback can be selected by the user.

Figure 5A:
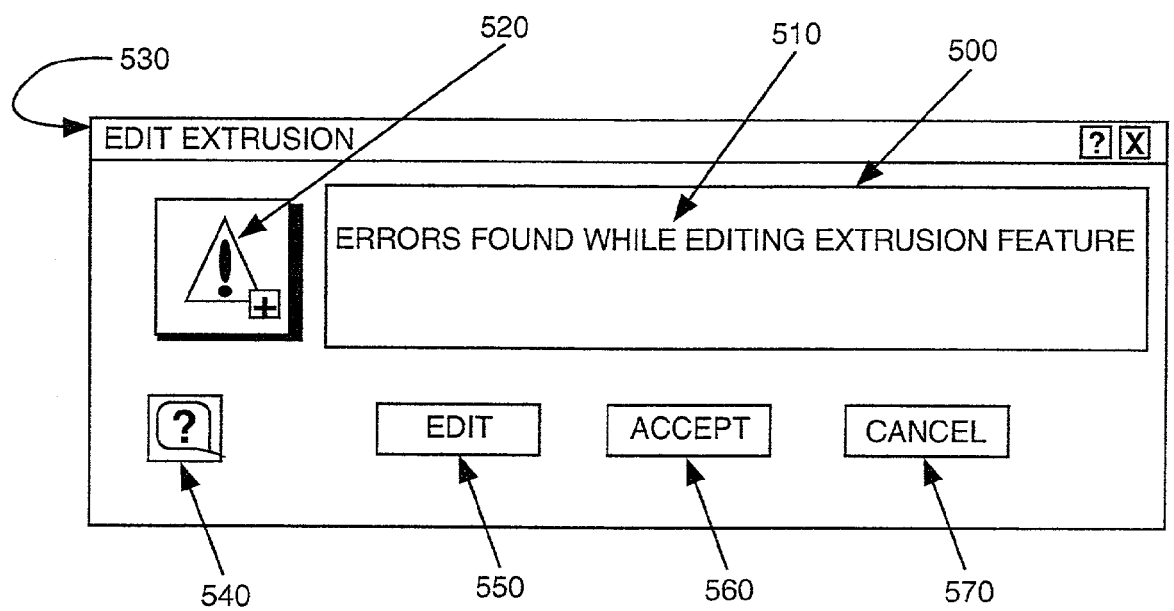
FIGS. 5A and 5B are one embodiment of an error reporting user interface suitable for use with the present invention.
Figure 5B:
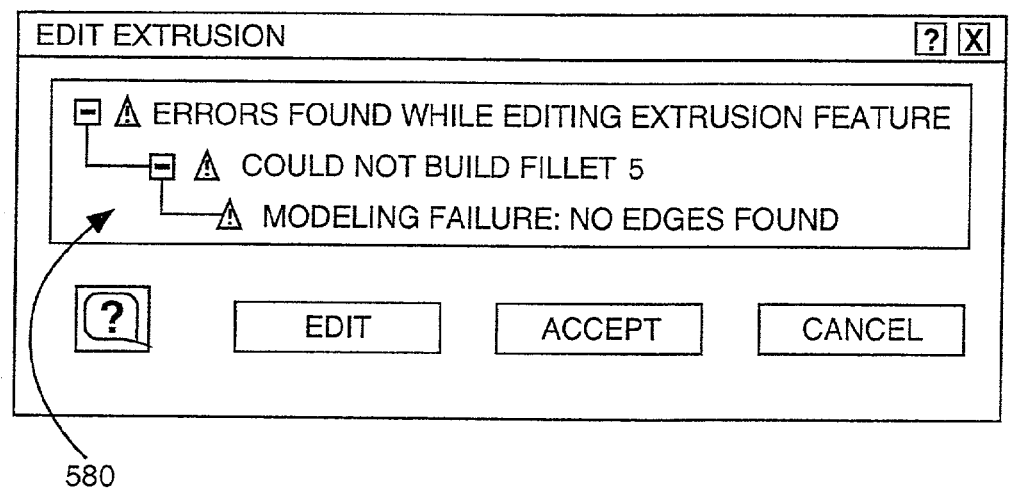

FIGS. 5A and 5B are one embodiment of an error reporting error user interface suitable for use with the present invention. FIG. 5A is one embodiment of basic error reporting interface. Title bar 530 provides the operation that caused the error/warning described. In one embodiment, title bar 530 is the standard Windows® title bar. Windows® is a registered trademark of Microsoft, Inc. of Redmond Wash. Icon 520 indicates whether an error or warning is described. In one embodiment, an exclamation mark (!) in a triangle is used to represent an error. The plus symbol (+) at the lower portion of icon 520 indicates that additional information is available about the error. Alternatively, other icons can be used.

Button 540 allows a user to request help, for example, context sensitive help. Button 550 allows the user to edit the design that caused the error/warning. Button 560 allows the user to accept the error/warning results and proceed. Button 570 allows the user to cancel the error/warning process.

Window 500 provides an area in which error/warning reports are displayed. In one embodiment, error/warning reports can be either be basic error/warning summaries or the reports can be more detailed error/warning descriptions. In the embodiment of FIG. 5A, sentence 510 provides a basic error summary, for example, "Errors found while editing extrusion function."

In one embodiment, selection of icon 520 causes the basic error/warning reporting interface of FIG. 5A to be replaced by the detailed error/warning reporting interface of FIG. 5B. In one embodiment, sentence 510 of FIG. 5A is replaced by error/warning description 580 of FIG. 5B. Error/warning description 580 provides hierarchical information related to the error that occurred as a result of the operation listed in title bar 530.

In one embodiment, the levels of the hierarchy are controlled by user input. For example, the minus signs (−) indicate that a particular level of the hierarchy can be condensed and a plus sign (+) indicates that a particular level of the hierarchy can be expanded. Thus, the user can have control over the amount of information displayed with respect to error/warning descriptions.

Figure 6:
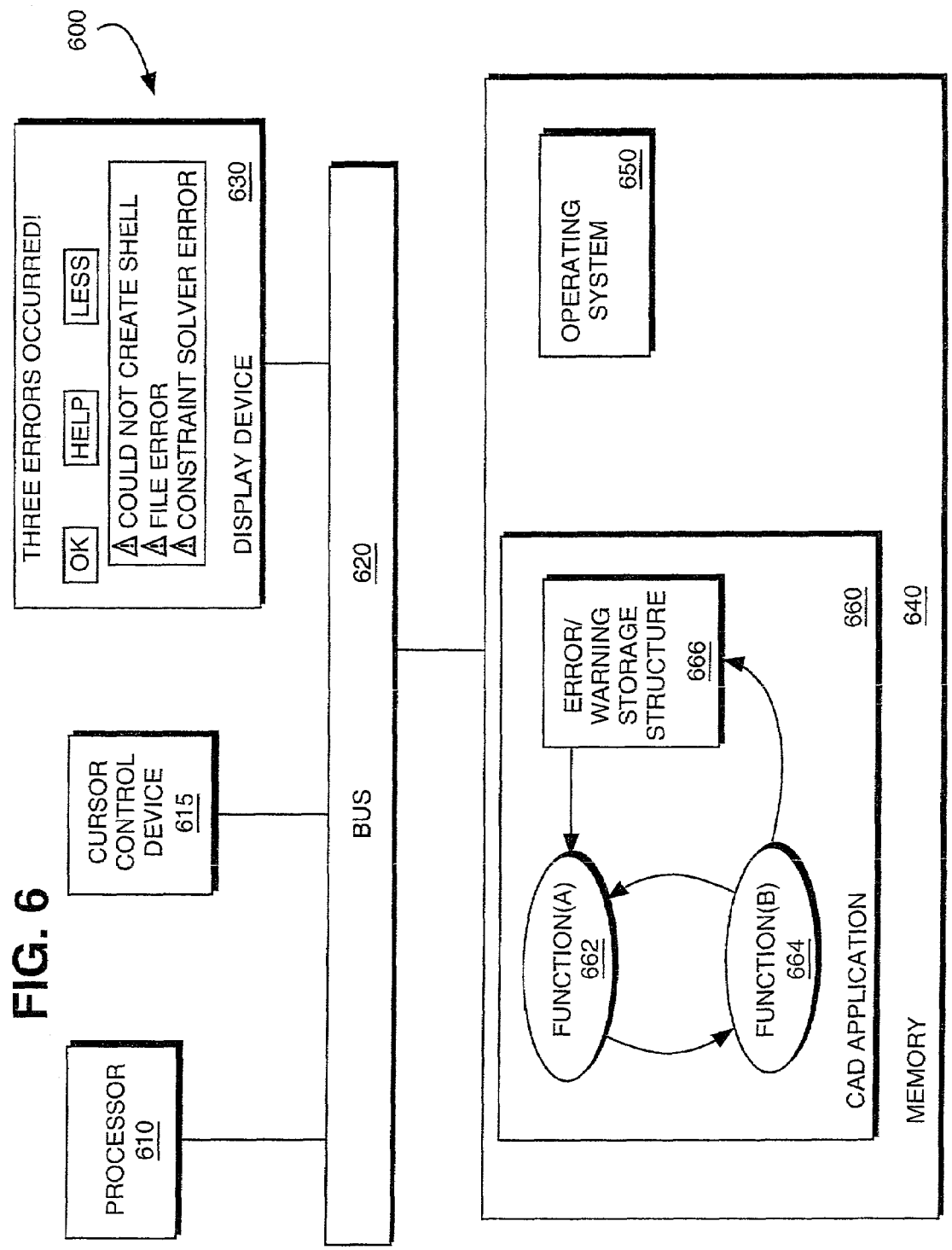
FIG. 6 is a computer system providing error/warning reporting according to one embodiment of the present invention.

FIG. 6 is a computer system providing error/warning reporting according to one embodiment of the present invention. Bus 620 provides interconnection between multiple components of computer system 600. Processor 610 executes sequences of instructions stored in memory 640. Display device 630 provides an output display when appropriate.

Memory 640 stores sequences of instructions for one or more applications. For example, operating system 650 provides an application layer between other applications and the hardware of computer system 600. Memory 640 also stores computer-aided design (CAD) application 660. In one embodiment CAD application 660 is Mechanical Desktop® available from Autodesk, Inc. of San Rafael, Calif. However, other applications including other CAD applications and other design related applications can be used with the present invention.

Function(A) 662 of CAD application 660 is a function that calls function(B) 664. Other types of function calls, for example, calls to operating system 650 can also be made. During execution of function(B) an event that causes an error or a warning occurs. An indication of the error/warning is stored in error/warning storage structure 666 as described above. Function(B) returns a result to function(A) indicating that an error/warning occurred and that additional information is stored in error/warning storage structure 666.

Processor 610 continues execution of CAD application 640 as appropriate, which may be to continue execution or to report errors/warnings that have occurred. In reporting of errors/warnings, sequences of instructions in CAD application 660 cause processor 610 display an error/warning report interface on display device 630. For example, the error/warning summary/log of FIGS. 4A and 4B can be used.

A user of computer system 600 can use cursor control device 615 to request more or less information related to the error/warning summary or log displayed on display device 630. Thus, the user has a measure of control over the amount of information displayed regarding one or more errors/warnings that occurred during use of CAD application 660.

In summary, the present invention provides improved error reporting and recovery as compared to that of the prior art. A central error/warning storage structure is used to reduce the number of error/warning messages presented to a user as the result of a single unexpected result. An error/warning reporting interface provides the user with a selectable amount of information as to error/warning recovery options. Thus, the user is provided with a more concise and more effective error/warning recovery options.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   recognizing an occurrence of one or more software events that result in at least one of an error or a warning;
   storing an indication of the error or warning in an error/warning storage structure; and
   returning a result from a function call that indicates that the error/warning indication has been stored in the error/warning storage structure, wherein subsequent function call returns are not required to store error/warning indications resulting from the event causing the stored indication.

2. The method of claim 1, wherein storing an indication of the error or warning includes a thin wrapper class structure.

3. The method of claim 1, further comprising:
   displaying a general message based on one or more error/warning indications stored in the error/warning storage structure.

4. The method of claim 3, further comprising:
   expanding the general message to provide additional error/warning information in response to user input.

5. The method of claim 1, further comprising:
   indicating a design element causing the error or warning.

6. The method of claim 1, wherein the function call is for a first function, the method further comprising:
   adding information to the error/warning indication stored in the error/warning storage structure, the information reported from a second function that called the first function.

7. A machine-readable medium having stored thereon sequences of instructions, which when executed by a processor cause the processor to:
   recognize an occurrence of one or more software events that result in one of an error or a warning;
   store an indication of the error or warning in an error/warning storage structure; and
   return a result from a function call that indicates that the error/warning indication has been stored in the error/warning storage structure, wherein subsequent function call returns are not required to store additional error/warning indications resulting from the event causing the stored error/warning indication.

8. The machine-readable medium of claim 7, wherein the sequences of instructions that cause the processor to store an indication of the error or warning further comprise a sequence of instructions including a thin wrapper class structure constructor.

9. The machine-readable medium of claim 7, further comprising sequences of instructions, which when executed by the processor cause the processor to:
   display a general message based on one or more error/warning indications stored in the error/warning storage structure.

10. The machine-readable medium of claim 9, wherein the general message is expanded to provide additional error/warning information in response to user input.

11. The machine-readable medium of claim 7, further comprising sequences of instructions that cause the processor to indicate a design element cawing the error or warning.

12. The machine-readable medium of claim 7, wherein the function call is for a first function, further comprising sequences of instructions that cause the processor to;
   add information to the error/warning indication stored in the error/warning storage structure, the information reported from a second function that called the first function.

13. An apparatus comprising:
   means for recognizing the occurrence of one or more software events that result in one of an error or a warning;
   means for storing an indication of the error or warning, in an error/warning storage structure; and
   means for returning a result from a function call that indicates that the error/warning indication has been stored in the error/warning storage structure, wherein subsequent function call returns are not required to store additional error/warning indications In the error/warning storage structure.

14. The apparatus of claim 13, wherein the means for storing an indication of the error or warning comprise means for constructing a thin wrapper class structure.

15. The apparatus of claim 13, further comprising means for displaying a general message based on one or more error/warning indications stored in the error/warning storage structure.

16. The apparatus of claim 15, wherein the general message is expanded to provide additional error/warning information in response to user input.

17. The apparatus of claim 13, further comprising means for indicating a design element causing the error/warning.

18. The apparatus of claim 13, wherein the function call is for a first function, the apparatus further comprising:
- means for adding information to the error/warning indication stored in the error/warning storage structure, the information reported from a second function that called the first function.

19. A method comprising:
- detecting at least one of an error or a warning in a first function;
- reporting an error/warning message from the first function to an error/warning storage structure;
- storing the error/warning message in the error/warning storage structure;
- adding information to the error/warning message stored in the error/warning storage structure, the information reported from a second function that called the first function; and
- returning a result from a function call for the second function indicating that the error/warning message is stored in the error/warning storage structure.

20. The method of claim 19, wherein the second function calls the first function and the first function returns a result to the second function indicating that the error/warning message is stored in the error/warning storage structure.

21. A computer program product, tangibly stored on a computer-readable medium, comprising instructions operable to cause a programmable processor to;
- detect at least one of an error or a warning in a first function;
- report an error/warning message from the first function to an error/warning storage structure;
- store the error/warning message in the error/warning storage structure;
- add information to the error/warning message stored in the error/warning storage structure, the information reported from a second function that called the first function; and
- return a result from a function call for the second function indicating that the error/warning message is stored in the error/warning storage structure.

22. The computer program product of claim 21, wherein the second function calls the first function and the first function returns a result to the second function indicating tat the error/warning message is stored in the error/warning storage structure.

* * * * *